United States Patent [19]

Sullivan

[11] Patent Number: 5,497,226
[45] Date of Patent: Mar. 5, 1996

[54] QUADRATURE DIFFRACTIVE ENCODER

[75] Inventor: Paul F. Sullivan, Westwood, Mass.

[73] Assignee: Polaroid Corporation, Cambridge, Mass.

[21] Appl. No.: 293,811

[22] Filed: Aug. 22, 1994

[51] Int. Cl.$^6$ .................................................. G01B 11/02
[52] U.S. Cl. .................................. 356/4.01; 356/356
[58] Field of Search ............................ 356/356, 354, 356/4.01

[56] References Cited

U.S. PATENT DOCUMENTS

| | | | |
|---|---|---|---|
| 5,000,572 | 3/1991 | Nose et al. | 356/356 |
| 5,151,754 | 9/1992 | Ishibashi et al. | 356/356 |
| 5,347,355 | 9/1994 | Eguchi | 356/356 |
| 5,414,514 | 5/1995 | Smith et al. | 356/363 |

OTHER PUBLICATIONS

H. F. Talbot, "Facts relating to Optical Science. No. IV." *The London and Edinburgh Philosophical Magazine and Journal of Science.* Third Series. vol. 9, No. 56. pp. 401–407. Dec. 1836.

*Primary Examiner*—Mark Hellner
*Attorney, Agent, or Firm*—Robert A. Sabourin

[57] ABSTRACT

A preferred position detection system for accurate one-dimensional operation is realized using a diffractive encoder which provides two digital output signals 90° out of phase. The two output signals correspond to relative movement between two objects. The diffractive encoder includes: a light source; a collimating lens; a mask; a diffractive grid; four photodetectors; and two comparators. Light from the light source is collimated through the collimating lens, selectively passed through the aperture in the mask, diffracted by the diffractive grid, sensed by the four photodetectors, then compared by the comparators to produce the two digital output signals which represent relative movement between the mask and the diffractive grid.

10 Claims, 6 Drawing Sheets

QUADRATURE DIFFRACTIVE ENCODER

FIELD OF THE INVENTION

This invention relates to a general purpose encoder for detecting the position of an apparatus, or a light beam incident upon the apparatus, by employing an encoding scheme to provide accurate one dimensional positional information. More particularly, the invention is directed towards a quadrature diffractive encoder for sensing light beams diffracted in quadrature to produce two output signals which are 90 degrees out of phase with one another and thus compatible with standard encoder support hardware such as readouts and controllers for motor drivers.

BACKGROUND OF THE INVENTION

General purpose optical encoders are common for position and motion sensing in a variety of systems that require accurate positioning of equipment such as telescopes, milling machines, lathes, etc. Common encoders include rotary and linear types in which a rotary encoder uses a code wheel and a linear encoder uses a linear scale. Both types of encoders are provided with a light source, photodetectors and a signal processor.

A basic encoder operates by emitting a light beam from a source through a collimating lens to a linear or rotary scale which typically includes a grating of opaque and transparent sections. The collimated light beam passes through the transparent sections to appropriately positioned photodetectors so that the photodetectors receive a high intensity of light during transmission and no light when the opaque sections block the collimated light. A conventional encoding system is intensity sensitive, so that the detection of diffracted light by the photodetectors introduces detection error. Although a fine grating is desirable to improve detection accuracy, a relatively coarse grating is necessary to minimize diffraction of light and the resultant detection error.

U.S. Pat. No. 5,000,572 issued 19 Mar. 1991 to Nose et al. discloses a distance measuring system for measuring a distance between two objects by detecting the phase of diffracted light. Specifically, the distance measuring system includes: a first diffraction grating provided on one of the two objects and disposed along the relatively moving direction of the two objects; and a measuring portion provided on the other object. The measuring portion includes a second diffraction grating, a light source and a photodetecting system, wherein the light source provides lights which are projected upon two points on the second diffraction grating so that they emanate from the two points in the form of diffraction lights having different orders. The diffraction lights are directed to the same point on the first diffraction grating and are diffracted again by the first diffraction grating so that they are emitted in the same direction, and the photodetecting system is operable to detect a change in the light intensity caused by the interference of the two lights emanating from the first diffraction grating. The distance measuring system further includes a detecting system for detecting the relative moving distance of the two objects on the basis of the detection by the photodetecting system. As described above, the Nose distance measuring system measures the phase of diffracted light using two diffractive gratings with the accompanying optics and electrical circuitry.

U.S. patent application Ser. No. 08/201,256, filed on 24 Feb. 1994 as a continuation-in-part of abandoned U.S. application No. 07/776,565 filed 15 Oct. 1991 (both by Paul F. Sullivan), discloses a different light beam position detection and control apparatus which employs diffraction patterns. More specifically, a system is disclosed for accurate one dimensional positioning of an object using three repeating diffractive patterns or two-dimensional positioning using six superimposed patterns. Although the disclosed encoding system exhibits excellent, improved performance over the prior art, the output of the system does not conform to the industry standard for encoder outputs having two signals which are 90 degrees out of phase with one another. Dual encoder outputs are typically in quadrature to match the input requirements of readouts and controllers of motor drivers. One standard incremental optical linear encoder is model SRL manufactured by DRC which specifies symmetry at 180°± 10°, quadrature at 90°±45° and maximum operating speed at 50 inches per second.

Consequently, it is a primary object of the invention to provide a general purpose encoder for position detection and control which offers improved resolution performance over the above and other prior teachings by accurately detecting diffracted light beams and generating two outputs in quadrature.

It is another object of the invention to provide a general purpose quadrature diffractive encoder with improved electrical and mechanical characteristics.

The above and other objects will, in part, appear hereinafter and, in part, be obvious when the following detailed description is read in conjunction with the drawings.

SUMMARY OF THE INVENTION

A position detection and control system for accurate one-dimensional operation is realized using a quadrature diffractive encoder for detecting the position of an object or a light beam relative to a given reference. A preferred embodiment of the diffractive encoder includes: a light source providing a light beam; a collimating lens for receiving the light beam from the light source and producing a collimated light beam; a mask with an aperture having one or more slits each having a same length, for selectively passing the collimated light beam; a diffractive grid for receiving the collimated light beam from the aperture of the mask and producing diffracted light beams which are either transmitted through or reflected from the diffractive grid, where the diffractive grid consists of a first pattern and a second pattern arranged in a side-by-side relationship with respect to each other, the first pattern having a plurality of pairs of first sections which first sections of each pair are mirror images of one another connected along common borders within the first pattern, the second pattern having a plurality of pairs of second sections which second sections of each pair are mirror images of one another connected along common borders within the second pattern, the first and second sections each having a length equal to the slit lengths, each first section having a plurality of equidistant, parallel and straight lines or textures, each second section having a plurality of equidistant, parallel and straight lines or textures, the lines or textures of each pair of first sections forming first angles along the common borders within the first pattern, the lines or textures of each pair of the second sections forming second angles along the common borders within the second pattern, the first angles being complementary with the second angles, the first and second patterns being offset by one-half of one section length; first and second photodetectors positioned to produce first and second photodetector signals in response to detecting first and second diffracted light beams, respectively; a first comparator for producing a first system output in response to receiving the first and second photodetector signals; third and fourth photodetectors positioned to produce third and fourth photodetector signals in response to detecting third and fourth diffracted light beams, respectively; and a second comparator for producing a second system output in response to receiving the third and fourth photodetector signals, the second system output being ninety degrees out of phase with the first system output.

BRIEF DESCRIPTION OF THE DRAWINGS

The novel features that are considered characteristic of the invention are set forth with particularity in the appended claims. The invention itself, however, both as to its organization and its method of operation together with other objects and advantages thereof will be best understood from the following description of illustrated embodiments when read in conjunction with the accompanying drawings wherein:

DETAILED DESCRIPTION OF THE PREFERRED EMBODIMENTS

The operation and use of diffractive grating patterns for a position detection and control device are detailed in previously cited U.S. patent application Ser. No. 08/201,256 herein incorporated by reference in its entirety. It has been determined that numerous benefits such as improvement of electrical and mechanical performance are available by encoding diffracted light beams for position detection. The following claimed invention provides the matching of system outputs of a diffractive encoder with industry standard readouts and controllers which respond to positional encoder signals in quadrature.

Figure 1:
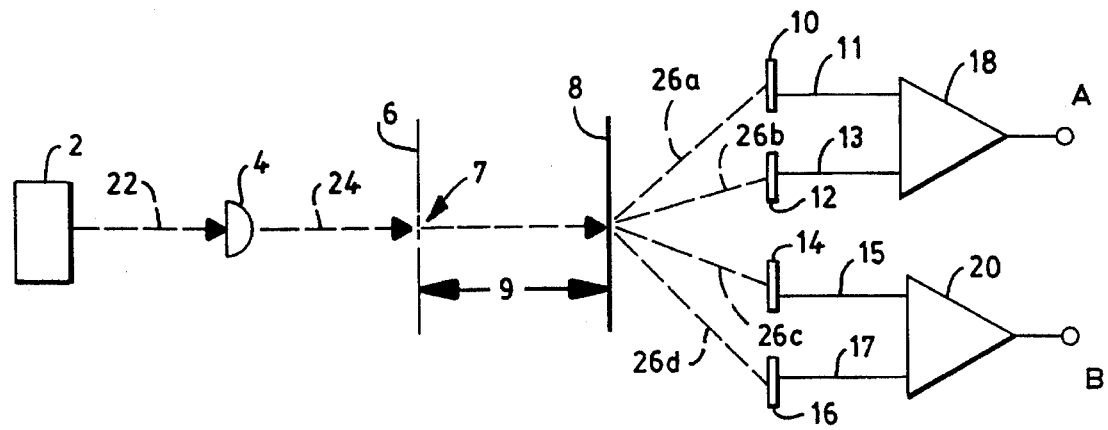
FIG. 1 is a schematic and diagrammatic representation of a first embodiment of a position detection system including a quadrature diffractive encoder in a transmissive mode according to the invention.
Figure 3:
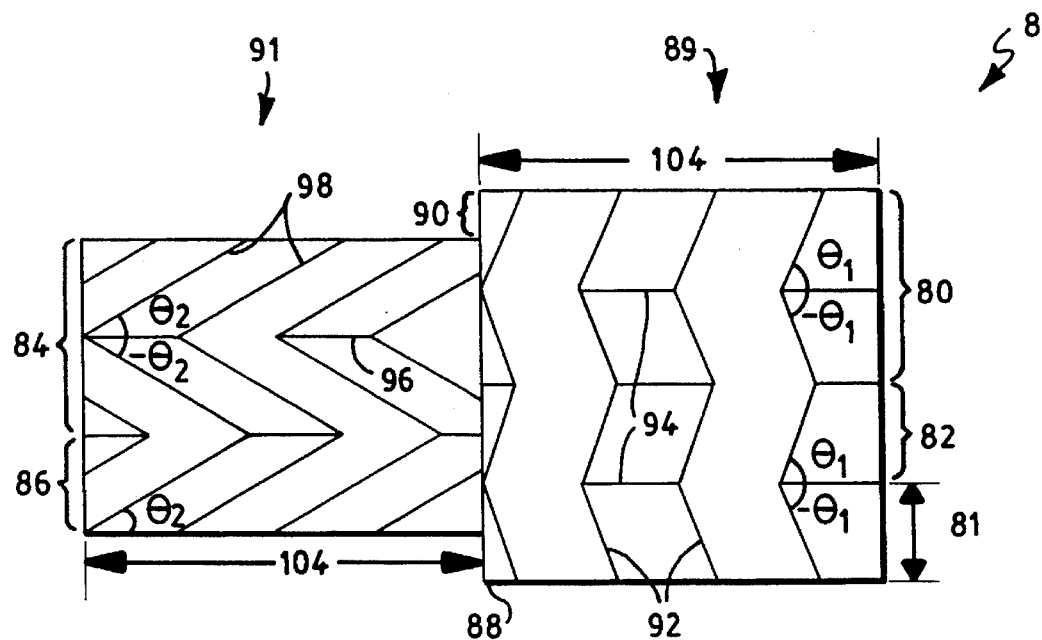
FIG. 3 is an enlarged diagrammatic view of preferred patterns of the diffractive grid according to the invention.
Figure 4:
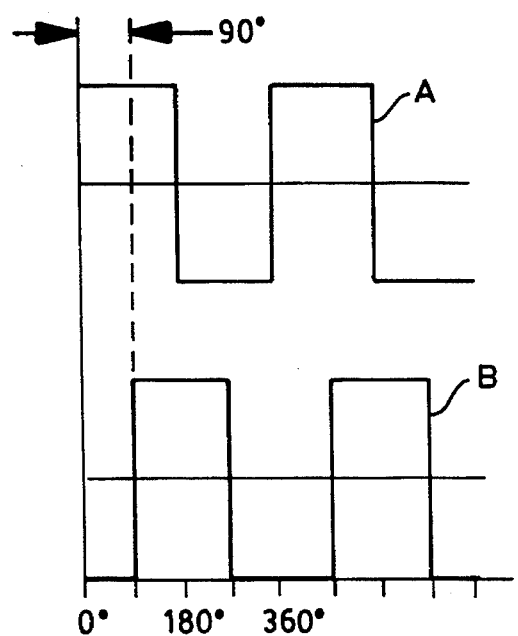
FIG. 4 is a graph showing the phase relationship between encoder outputs A and B in quadrature.

FIG. 1 illustrates a position detection system for detecting relative position between two objects using a quadrature diffractive encoder according to the invention. A light source 2, which for example could be a laser diode, an LED or any other source whether coherent or incoherent, emits light beam 22 which is converted to a collimated light beam 24 while passing through collimating lens 4. The collimated light beam 24 passes through an aperture of one or more slits 7 in a mask 6 and travels a distance 9 from the mask 6 to a diffractive grid 8. The relative movement between two objects (i.e. the mask 6 and the diffractive grid 8, or objects mounted thereto) is detected and measured by the quadrature diffractive encoder, so that either or both of the mask 6 and the diffractive grid 8 could be moveable. In this particular embodiment, the mask 6 is moveable along its principal axis (shown in FIG. 3). The distance 9 is an integer multiple of the Talbot distance when more than one slit 7 is present in the mask 6, for imaging mask 6 at one-to-one onto grid 8. The Talbot distance is well known in the art as defined in H. F. Talbot's December 1836 article published in The London and Edinburgh Philosophical Magazine and Journal of Science. When using a mask 6 having more than one slit 7, a reasonably monochromatic light source 2 should be used in accord with Talbot distancing. The diffractive grid 8 consists of two repetitive patterns 89 and 91 (see FIG. 3) which will cause the collimated light beam incident upon the diffractive grid to diffract. For instance, each repetitive pattern on the diffractive grid may consist of a plurality of pairs of sections each having a plurality of equidistant, parallel straight lines or gratings as shown in FIG. 3. These lines may either be intensity modulators, e.g. chrome on glass or black ink on white paper, or phase modulators, e.g. hills and valleys embossed in a clear or reflective substrate, the latter example in each case applicable to the reflection mode described below. After traversing distance 9, the light beam 24 passes through the diffractive grid 8 whereupon the diffracted light beams 26a, 26b, 26c and 26d are detected by photodetectors 10, 12, 14 and 16, respectively. The photodetectors are accurately positioned to detect the diffracted light beams in accordance with the predetermined diffraction pattern dictated by the angles and spacing of the lines on the diffractive grid 8. As the mask 6 moves in one dimension along its principal axis, the amount of diffracted light detected by each photodetector will change. The outputs 11 and 13 of photodiodes 10 and 12, respectively, are compared in comparator 18 which thereafter produces a square wave, shown in FIG. 4, as the first system output signal A. The second system output signal B, produced when the outputs 15 and 17 of photodiodes 14 and 16, respectively, are compared in comparator 20, is also a square wave and is 90 degrees out of phase with signal A as shown in FIG. 4. The electrical degrees of the waveforms of FIG. 4 correspond to the distance travelled along the diffractive grid 8 so that the period of either waveform is equal to the period of the diffractive grid 8. Specifically, the length of a first section 81 or a second section 86 of FIG. 3 equates to 180° on the phase scale of FIG. 4.

Figure 2:
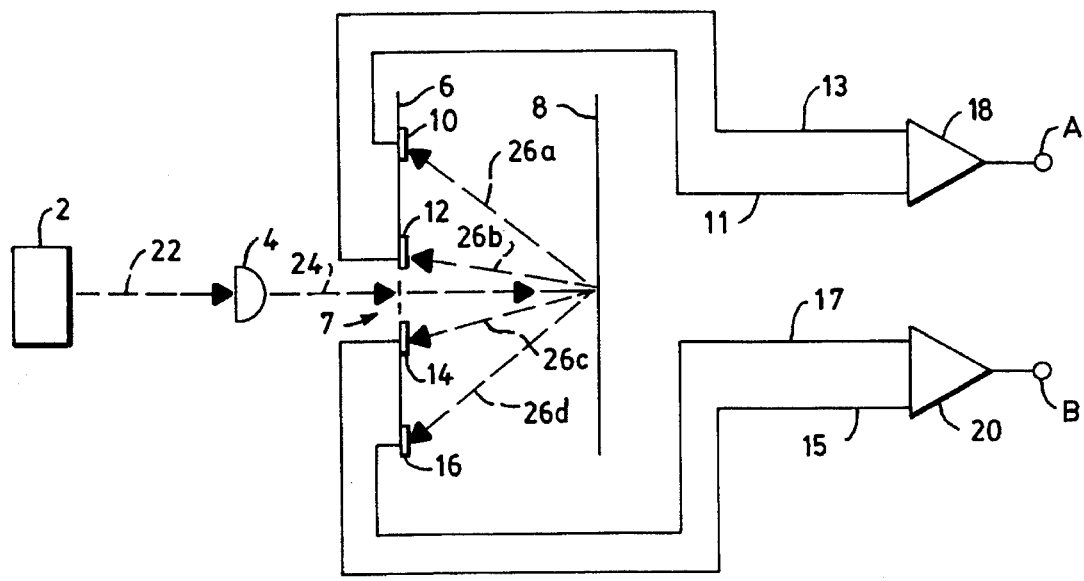
FIG. 2 is a schematic and diagrammatic representation of a second embodiment of a position detection and control system including a quadrature diffractive encoder in a reflective mode according to the invention.

FIG. 2 illustrates a diffractive encoder in reflective mode where the system operation is the same as previously described for the transmissive mode of FIG. 1 except that the diffractive grid 8 reflects the collimated light beam 24 as diffracted light beams 26a, 26b, 26c and 26d to photodiodes 10, 12, 14 and 16, respectively, which photodiodes are appropriately positioned as shown alongside the mask 6. The outputs of the photodiodes are again received by comparators 18 and 20 which produce the two quadrature output signals A and B of FIG. 4.

As best seen in FIG. 3, a portion of a preferred diffractive grid 8 consists of a first repeating pattern 89 having a plurality of first section pairs 80 and a second repeating pattern 91 having a plurality of second section pairs 84. Each first section pair 80 includes a pair of first sections 82 which are mirror images of one another along a common border 94, and each first section consists of a plurality of equidistant, parallel and straight lines 92. The straight lines 92 in each first section form first angles of $\Theta_1$ and $-\Theta_1$ which mirror one another along the common border 94. Similarly, each second pair 84 includes a pair of second sections 86 which are mirror images of one another along a common border 96, and each second section consists of a plurality of equidistant, parallel and straight lines 98. The straight lines 98 in each second section form second angles $\Theta_2$ and $-\Theta_2$ which mirror one another along the common border 96 and are complementary to the first angles $\Theta_1$ and $-\Theta_1$. The plurality of first section pairs and the plurality of second section pairs are arranged along intersection 88 in a side-by-side relationship with respect to each other. Both the first sections 82 and the second sections 86 have the same lengths 81 measured along the direction of the principal axis of movement of the mask (shown by the double sided arrow in FIG. 5). However, the widths 104 (measured along the axis perpendicular to the principal axis of movement of the mask) of the first sections 82 may vary from the widths 104 of the second sections 86. The plurality of first section pairs is offset from the plurality of second section pairs along the intersection 88 by a distance 90 which is one-half of the section length 81. The one-half section length offset causes the diffracted light beams 26a, 26b, 26c and 26d to ultimately produce two system outputs A and B (see FIGS. 1, 2 and 4) in quadrature, typically to a tolerance of about ±1.5° comparable to the symmetry.

Figure 5:
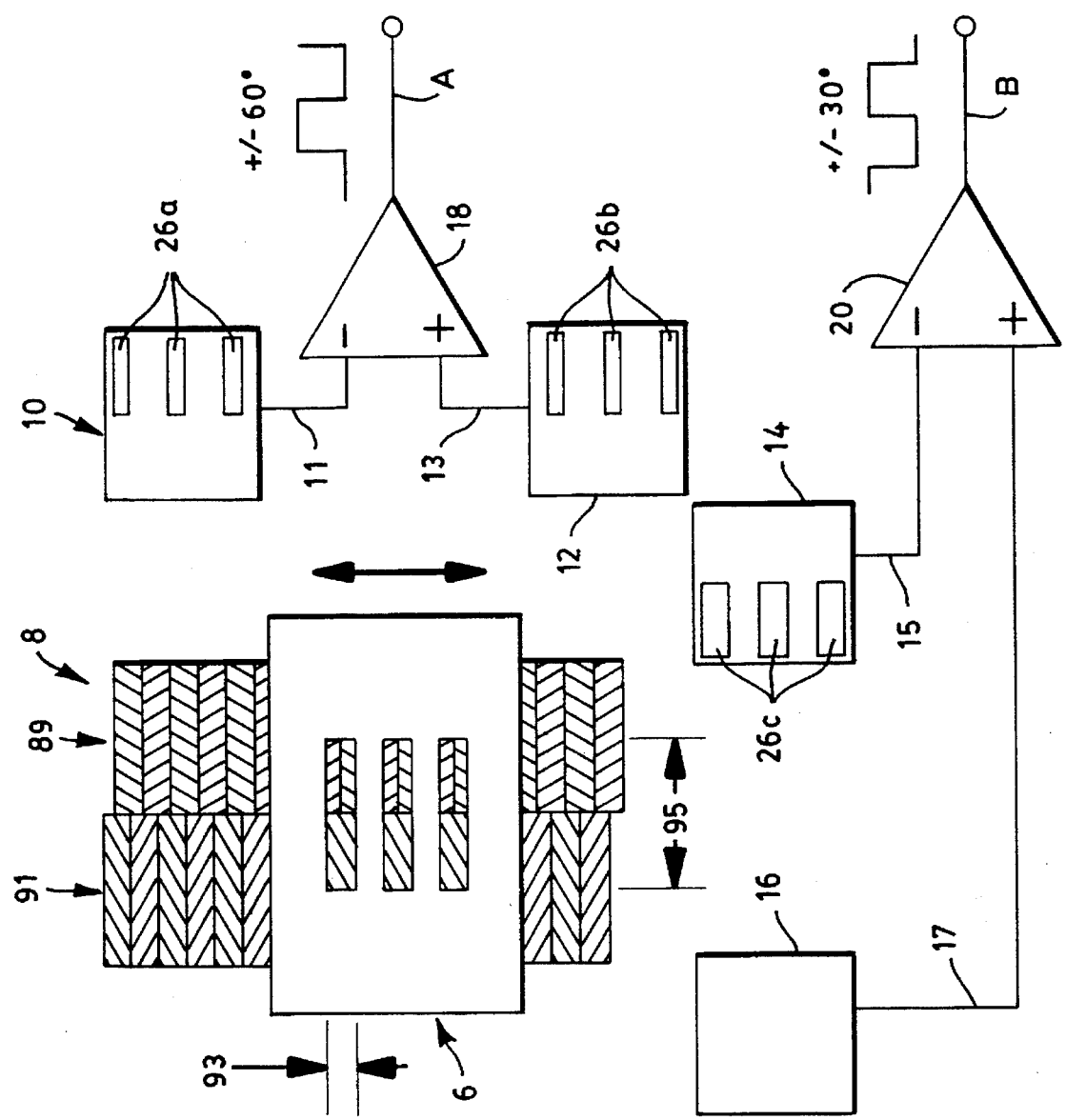
FIG. 5 is a schematic and diagrammatic representation of a quadrature diffractive encoder according to the first or second embodiments of FIGS. 1 or 2, utilizing a first preferred diffractive grid having two repeating patterns as shown for tracking movement along a principal axis of a mask.

FIG. 5 shows parts of the diffractive encoder system of either FIG. 1 or FIG. 2. The diffractive grid or scale 8 is represented in this case by striped sections as previously described in conjunction with FIG. 3, where the photodetectors 10, 12, 14 and 16 receive diffracted light beams 26a, 26b, 26c and 26d, respectively. The photodiodes in FIG. 5 are represented as being an integer multiple of a Talbot distance away from the diffractive grid 8 so that the illuminated portions of the diffractive grid 8 (when the aperture contains more than one slit) are truly imaged onto the photodiodes in a manner which illustrates where on the diffractive scale 8 the diffractive light beams 26a, 26b, 26c and 26d originated. For instance, the diffracted beams 26a and 26b from the fight side of the diffractive scale 8 are captured by the photodiodes 10 and 12, and the diffracted beams 26c and 26d from the left side of the diffractive scale 8 are captured by the photodiodes 14 and 16. The photodiode outputs 11 and 13 from photodetectors 10 and 12, respectively, are received by comparator 18 which in turn produces system output A, whereas the photodiode outputs 15 and 17 from photodiodes 14 and 16, respectively, are received by comparator 20 which in turn produces system output B. Of course, the outputs A and B are 90° out of phase since the first and second repeating patterns are offset by one-half of the section length.

In FIG. 5, the lines of the first sections of first repeating pattern 89 produce the diffracted light beams 26a and 26b which result in output A and are at ±60° with respect to the common borders 94 (see FIG. 3). Such mirror image lines are immune to any bias introduced by the unequal length 93 and width 95 of the aperture slits. The lines of the second sections produce the diffracted light beams 26c and 26d which result in output B and are at ±30° with respect to the common borders 96 and are also immune to the aperture aspect ratio effects. By aligning any process, such as solvent embossing of a plastic web, used in the manufacture of the diffractive scale 8 parallel or perpendicular to the common border direction, immunity to process effects can also be enhanced. Making the angles of the lines of the two repeating patterns complementary allows the photodetector array 10, 12 to be identical to the photodetector array 14, 16, although mounted at right angles to one another, to allow commonality of parts. By choosing angles of ±22.5° and ±67.5° (rather than ±30° and ±60°), the angular separation between diffracted light beams is maximized, minimizing crosstalk. By choosing angles of ±15° and ±75°, the option of using commercially available split photocells which exhibit excellent side-to-side matching is provided.

However, the above angles are exemplary rather than limiting and any angles which allow the diffracted light beams to be separated can be used. Although any diffractive grid according to the teachings herein requires that the offset length 90 is one-half of the section length 81 and the length 81 of each section equals the length 93 of the aperture slits in the mask, the other dimensions can be varied. For instance, each section could consist of a plurality of curved lines or textures, the pairs of sections need not be mirror images of one another, and the first angles formed in first sections need not be complementary to the second angles formed in second sections.

Figure 6:
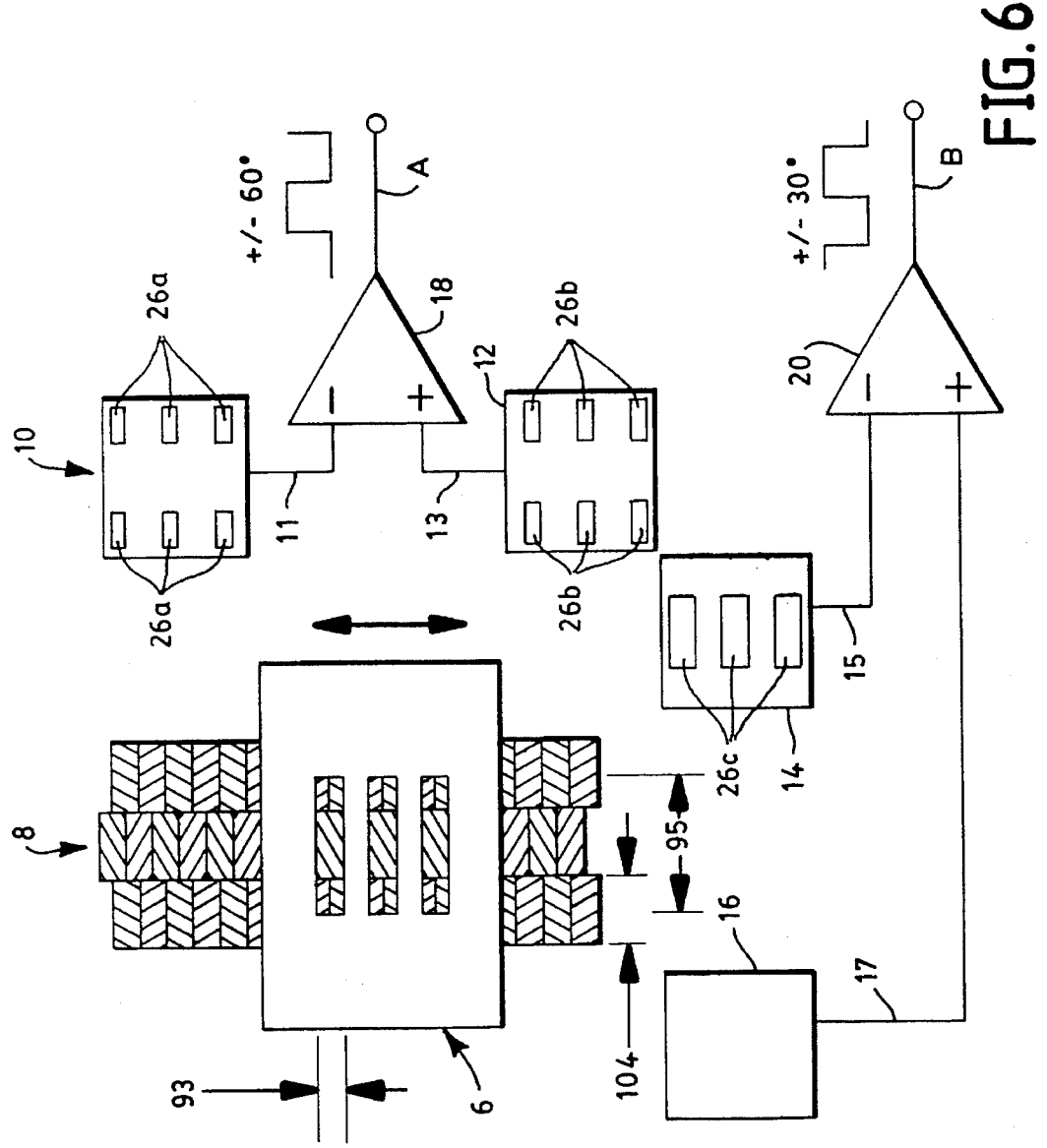
FIG. 6 is a schematic and diagrammatic representation of a quadrature diffractive encoder according to the first or second embodiments of FIGS. 1 or 2, utilizing a second preferred diffractive grid designed to correct for yawing of a mask and having three repeating patterns as shown for tracking position along the principal axis of the mask.

Continuing with FIG. 5, the system output signals A and B are generated as the mask 6 moves along its principal axis as shown by the double sided arrow. Since each comparator 18 and 20 processes signals reflected or transmitted from only one-half of the diffractive grid, the system output signals A and B are not effected (except in signal-to-noise ratio) by slight left or fight wandering of the mask 6 across the diffractive grid 8. Although appreciable wandering left or fight of the mask 6 is unlikely in a precision motion system, the current encoder system can be made immune to such possible wandering by making the widths 104 of the first and second repeating patterns about one-half of the width of the slits in the mask 6 as shown in FIG. 6. This feature also allows the diffractive grid 8 to be slit from a wide web without precise control. Another advantage of the above dimensional relationships between the mask slit widths and the widths of the first and second repeating patterns, is the reduction of phasing errors that could occur between the two output channels corresponding to signals A and B. If the mask 6 is roughly centered on one of the diffractive repeating patterns which is one-half of the width of the slits as shown in FIG. 6, then the relative phasing of the two quadrature signals is precise to about one-tenth of a micron, even in the face of severe yawing, i.e. rotation, of the mask in the amount of several tenths of a degree. If the widths of the repeating patterns are not about one-half of the width of the slits or neither pattern is centered in the slits, then yawing of the mask could effect the encoding system of FIG. 5 by demonstrating phasing errors between the two channels amounting to one-half the width of the mask slit times the sine of the yaw angle.

Figure 7:
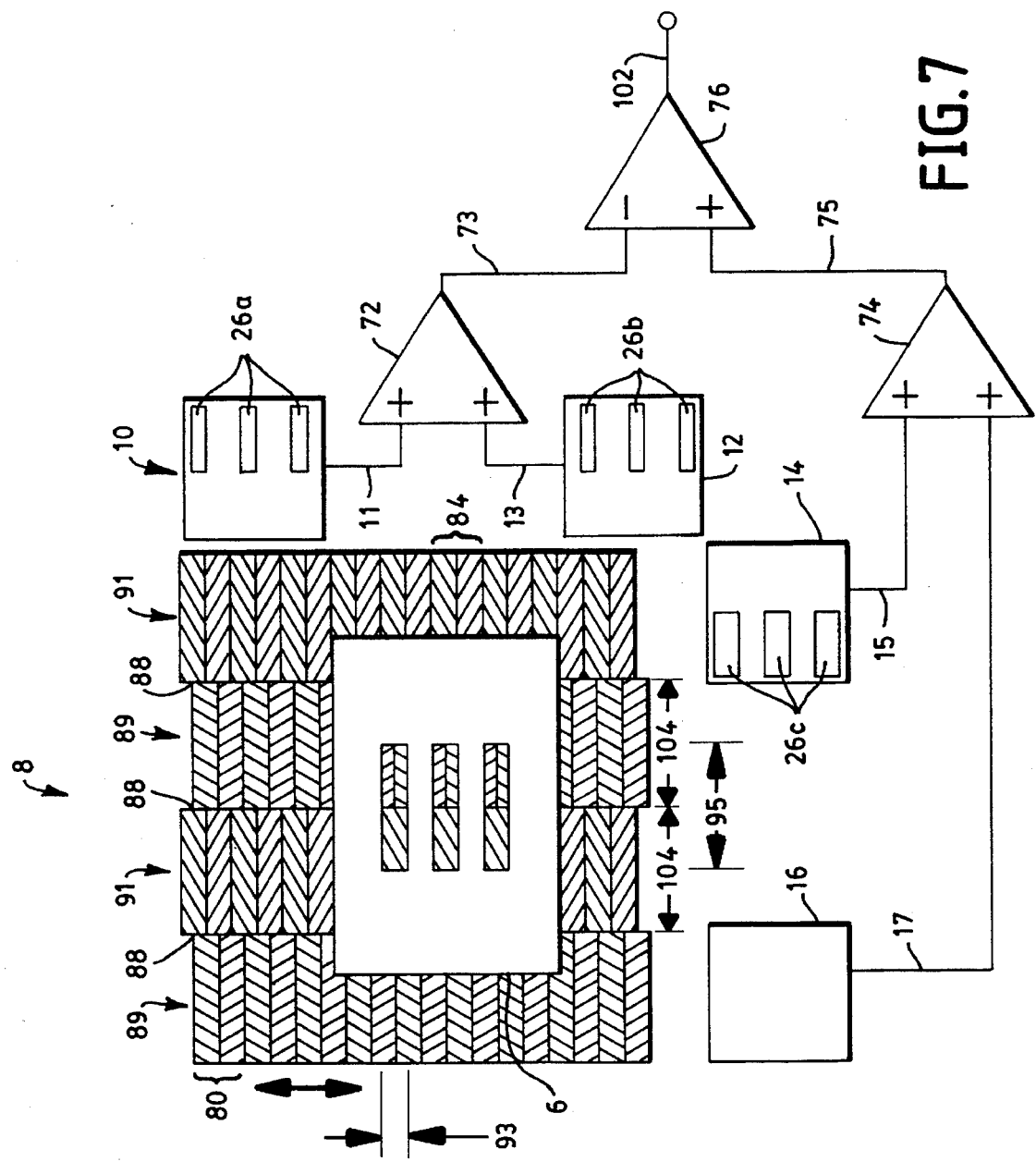
FIG. 7 is a schematic and diagrammatic representation of an analog position detection device, for joint use with the quadrature diffractive encoder of FIGS. 1 or 2, for tracking position along an axis perpendicular to the principal axis of the mask by utilizing the outputs of the photodetectors of the quadrature diffractive encoders.

FIG. 7 illustrates a position detection system which includes both quadrature position detection (electronics not shown) along the principal axis of movement of the mask 6

(shown by the double sided arrow) as previously described, and analog position detection along the axis perpendicular to the principal axis of the mask movement. Positional movement along the principal axis of the movement of the mask designated by the double sided arrows is controlled by a quadrature diffractive encoding system which produces system outputs A and B as previously described whereas, positional movement along the axis perpendicular to the principal axis of the movement of the mask can be controlled by an analog system based on the analog position signal 102 in response to the photodetector output signals 11, 13, 15 and 17. The length 93 of the transmitting slits of the mask 6 should equal the length 81 of first and second sections of the first and second repeating patterns 89 and 91, respectively, and each repeating pattern should be offset by one-half of a section length from bordering repeating patterns as previously discussed. Furthermore, the width 104 of each section should be substantially greater than one-half the width 95 of the transmitting slits of the mask 6. The photodiode outputs 11, 13, 15 and 17 from photodiodes 10, 12, 14 and 16, respectively, in addition to being supplied to comparators 18 and 20 for generation of the quadrature output signals A and B, are supplied to adders 72 and 74 as shown. A first sum signal 73 is generated from adder 72 by summing the photodiode output signals 11 and 13 from photodiodes 10 and 12, respectively, and a second sum signal 75 is generated from adder 74 by summing the photodiode output signals 15 and 17 from photodiodes 14 and 16, respectively. The first and second sum signals 73 and 75 are then received into differential amplifier 76 which produces an analog positional signal 102 whose value increases if the mask 6 wanders to the left, and whose value decreases if the mask 6 wanders to the right (as viewed in FIG. 7). The analog positional signal 102 is zero when the mask 6 is centered over a boundary 88 separating the first and second repeating patterns 89 and 91. Connecting the analog positional signal 102 to a conventional analog servo system can cause the mask 6 to track a boundary 88 between two adjacent repeating patterns as the mask moves along the axis of the double sided arrows under the control of the quadrature servo system. In a practical sharing of the photodiodes 10, 12, 14 and 16 between the quadrature and analog servo systems, the photodiodes would need to drive current to voltage converters of conventional design (as shown in FIG. 8), whose outputs would drive the adders 72 and 74 in parallel with the comparators 18 and 20 (shown in FIG. 6).

Figure 8:
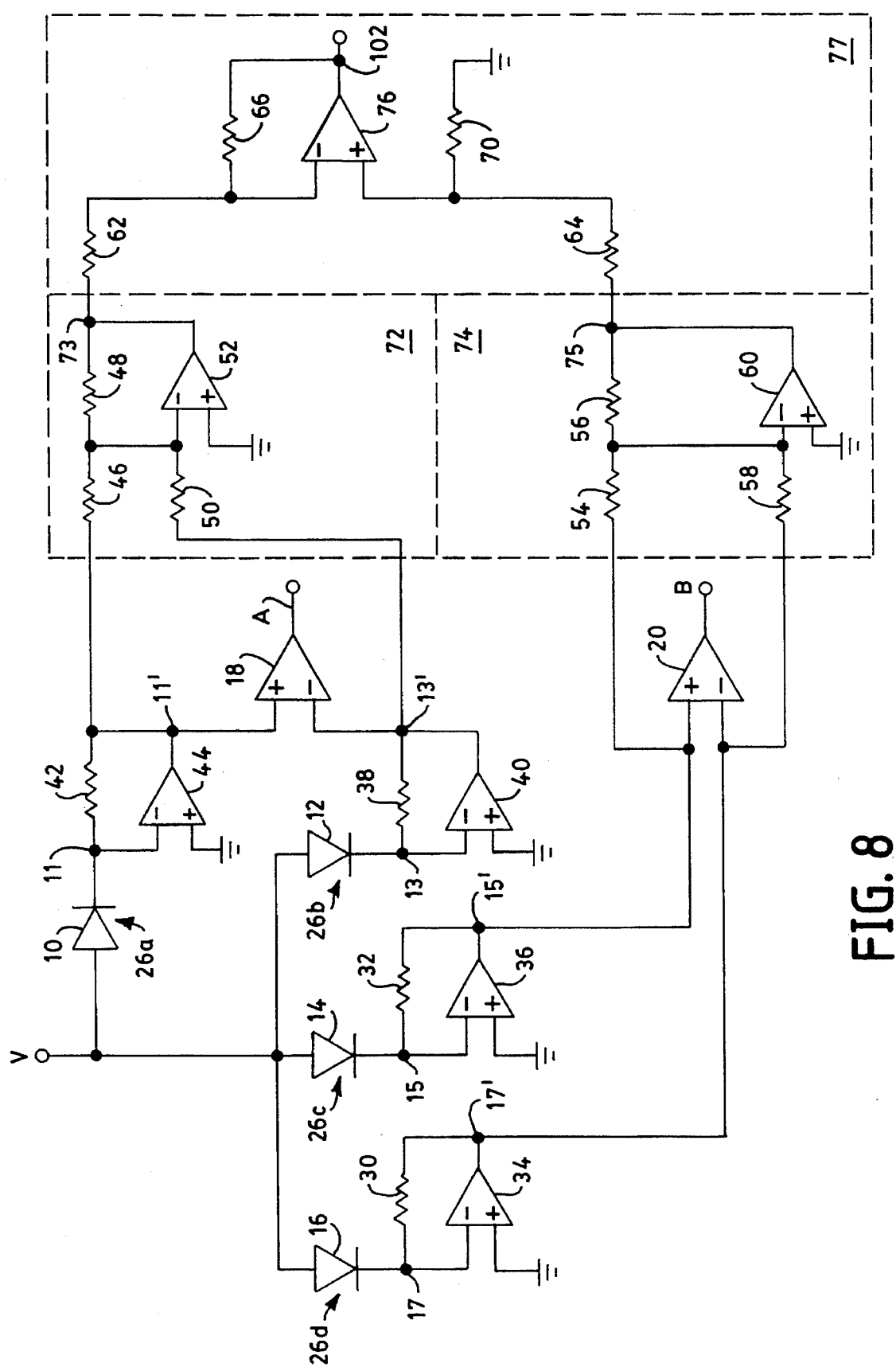
FIG. 8 is a detailed schematic diagram of the two-dimensional position detection device of FIG. 7 using a quadrature diffractive encoder together with an analog position detection device.

FIG. 8 is a detailed schematic diagram of the position detection system of FIG. 7, which includes both quadrature and analog position detection. The system includes photodiodes 10, 12, 14 and 16 which are supplied with a bias voltage V and are activated by reception of diffracted light beams 26a, 26b, 26c and 26d, respectively. When photodiode 10 receives the diffracted light beam 26a from diffractive grid 8, a photodiode output 11 is produced which is amplified through a preamplifier consisting of an operational amplifier 44 and a resistor 42, and the amplified signal 11' is supplied to the positive input of comparator 18. When the photodiode 12 receives the diffracted light beam 26b from diffractive grid 8, a photodiode output 13 is produced which is amplified though a preamplifier consisting of an operational amplifier 40 and a resistor 38, and the amplified signal 13' is supplied to the negative input of comparator 18. When photodiode 14 receives the diffracted light beam 26c from diffractive grid 8, a photodiode output 15 is produced which is amplified through a preamplifier consisting of an operational amplifier 36 and a resistor 32, then the amplified signal 15' is supplied to the positive input of comparator 20.

When the photodiode 16 receives the diffracted light beam 26d from diffractive grid 8, a photodiode output 17 is produced which is amplified though a preamplifier consisting of an operational amplifier 34 and a resistor 30, and the amplified signal 17' is supplied to the negative input of comparator 20. Each of the preamplifiers acts as a current to voltage converter, and resistors 30, 32, 38 and 42 are preferably matched at about one megohm. The comparator 18 generates quadrature signal output A in response to the amplified photodiode signals 11' and 13', and the comparator 20 generates quadrature signal output B in response to the amplified photodiode output signals 15' and 17'.

Adder 72 consists of resistors 46, 48, 50 and operational amplifier 52. The amplified outputs 11° and 13' received from the preamplifiers of the photodiodes 10 and 12 are summed through resistors 46 and 50, then amplified through operational amplifier 52 coupled with resistor 48 to produce the first sum signal 73. Adder 74 consists of resistors 54, 56, 58 and operational amplifier 60. The amplified outputs 15' and 17' received from the preamplifiers of photodiodes 14 and 16 are summed through resistors 54 and 58, then amplified through the operational amplifier 60 coupled with resistor 56 to produce the second sum signal 75. Differential amplifier 77 consists of resistors 62, 64, 66 and 70 and operational amplifier 76. The difference between the first sum signal 73 and the second sum signal 75 is amplified by differential amplifier 77 to produce analog position signal 102. Each of the resistors 46, 48, 50, 54, 56, 58, 62, 64, 66 and 70 are preferably matched at about 10 kilohms.

In the case of an instrument requiring raster scanning in two dimensions with a fixed track-to-track spacing in the slow direction (e.g. a printer), this hybrid quadrature/analog encoder can be further developed. The diffractive grid 8 as previously described is extended to include alternating first and second repeating patterns 89 and 91 with the width 104 of each pattern chosen to be equal to the desired track-to-track spacing. During each track scan, the analog signal 102 is used as described above to keep the instrument centered on the proper track. At the end of each track scan (or during retrace for unidirectional operation), the analog control loop is disabled, the sign of the differential amplifier 77 is reversed, and the instrument is advanced open loop by about one track. When the analog control loop is reenabled at the start of the next track scan, the instrument will settle onto the next track, where it will remain centered as before.

The embodiments typically use a multi-slit mask Talbot imaged onto the diffractive grid. It will be apparent to one of ordinary skill in the art that conventional lens imaging is also acceptable. Furthermore, the encoding functionality is also available if the mask and its imaging are replaced simply by an elliptical focussed spot imaged through a single slit in the aperture of the mask, where the spot exhibits diameters that are comparable to the slit dimensions described above. U.S. patent application Ser. No. 08/210,256 explains the penalties incurred by this simplification.

The above described embodiments of the invention are preferred examples of the many variations and modifications which would be apparent to one of ordinary skill in the art in keeping with the invention as claimed and taught.

What is claimed is:

1. An optical encoder for detecting relative position between two objects, said optical encoder comprising:

a light source providing a light beam;

a collimating lens for receiving said light beam from the light source and producing a collimated light beam;

a mask comprising an aperture comprising one or more slits, each slit having a same length, for selectively passing said collimated light beam, said mask being physically associated with a first of said two objects;

a diffractive grid for receiving said collimated light beam from the aperture of the mask and producing diffracted light beams which are either transmitted through or reflected from said diffractive grid, said diffractive grid comprising a first pattern and a second pattern arranged in a side-by-side relationship with respect to each other, said first pattern comprising a plurality of first sections where pairs of said first sections are connected along common borders within said first pattern, said second pattern comprising a plurality of second sections where pairs of said second sections are connected along common borders within said second pattern, said first and second sections each having a length equal to the slit lengths, each said first section comprising a plurality of equidistant, parallel and straight lines or textures, each said second section comprising a plurality of equidistant, parallel and straight lines or textures, said first and second patterns being offset by one-half of one section length, said diffractive grid being physically associated with a second of said two objects;

first and second photodetectors positioned to produce first and second photodetector signals in response to detecting first ones and second ones of said diffracted light beams, respectively;

a first comparator for producing a first system output in response to receiving said first and second photodetector signals;

third and fourth photodetectors positioned to produce third and fourth photodetector signals in response to detecting third ones and fourth ones of said diffracted light beams, respectively; and a second comparator for producing a second system output in response to receiving said third and fourth photodetector signals, said second system output being ninety degrees out of phase with said first system output.

2. The optical encoder of claim 1, wherein said mask is positioned an integer multiple of a Talbot distance away from said diffractive grid when said aperture comprises more than one slit.

3. The optical encoder of claim 1, wherein said diffractive grid further comprises a plurality of repeating said first patterns alternately arranged in side-by-side relationships with a plurality of repeating said second patterns, said first and second patterns having a same width.

4. The optical encoder of claim 3, wherein said section width equals a width of said slits.

5. The optical encoder of claim 3, wherein said section width equals about one-half of a width of said slits.

6. The optical encoder of claim 1, wherein said first and second photodetectors comprise a first split photocell and said third and fourth photodetectors comprise a second split photocell.

7. The optical encoder of claim 1, wherein pairs of said first sections are mirror images of one another connected along said common borders within said first pattern.

8. The optical encoder of claim 7, wherein pairs of said second sections are mirror images of one another connected along said common borders within said second pattern.

9. The optical encoder of claim 8, wherein first angles resulting from the intersection of said plurality of straight lines or textures of said first sections and said common borders within said first pattern, are complementary with second angles resulting from the intersection of said plurality of straight lines or textures of said second sections and said common borders within said second pattern.

10. An optical encoder comprising:

means for generating a light beam;

a diffractive grid;

means for selectively transmitting the light beam to the diffractive grid so that the diffractive grid produces a two-dimensional diffraction pattern with diffractive orders arranged along predetermined angles;

means for detecting said diffractive orders and generating two digital outputs being 90° out of phase with one another in response to said detected diffractive orders, said two digital outputs corresponding to a relative movement between said transmitting means and said diffractive grid.

* * * * *